United States Patent [19]
McKenzie

[11] Patent Number: 6,003,139
[45] Date of Patent: Dec. 14, 1999

[54] COMPUTER SYSTEM INCLUDING POWER SUPPLY CIRCUIT WITH CONTROLLED OUTPUT POWER

[75] Inventor: Philip James McKenzie, Houston, Tex.

[73] Assignee: Compaq Computer Corporation, Houston, Tex.

[21] Appl. No.: 09/013,876

[22] Filed: Jan. 27, 1998

Related U.S. Application Data

[63] Continuation of application No. 08/720,211, Sep. 26, 1996, Pat. No. 5,801,522.

[51] Int. Cl.⁶ .......................................................... G06F 1/32
[52] U.S. Cl. .......................... 713/300; 713/320; 713/340; 365/226
[58] Field of Search .......................... 395/750.01–750.08; 365/226–229; 713/300, 310, 320, 330, 340

[56] References Cited

U.S. PATENT DOCUMENTS

| | | | |
|---|---|---|---|
| 4,600,875 | 7/1986 | Wortman | 323/303 |
| 4,703,191 | 10/1987 | Ferguson | 307/64 |
| 4,727,874 | 3/1988 | Bowers et al. | 606/38 |
| 4,808,858 | 2/1989 | Stoops | 307/544 |
| 4,920,285 | 4/1990 | Clark et al. | 307/571 |
| 4,982,148 | 1/1991 | Engelmann | 323/207 |
| 5,019,717 | 5/1991 | McCurry et al. | 307/66 |
| 5,319,536 | 6/1994 | Malik | 363/65 |
| 5,371,667 | 12/1994 | Nakao et al. | 363/124 |
| 5,640,105 | 6/1997 | Sobelman et al. | 326/36 |
| 5,752,046 | 5/1998 | Oprescu et al. | 395/750.01 |
| 5,825,642 | 10/1998 | Ishii et al. | 363/141 |

*Primary Examiner*—Ayaz R. Sheikh
*Assistant Examiner*—Ario Etienne
*Attorney, Agent, or Firm*—Sharp, Comfort & Merrett, P.C.

[57] ABSTRACT

A computer system includes a computer system unit and a power supply circuit. The power supply circuit is coupled to receive input power and generate output power. This circuit includes a circuit to generate a control signal that is related to the power level of the input power. The control signal has a first value relative to the input signal if the input signal exceeds a selected threshold level and the control signal has a second value relative to the input signal if the input signal does not exceed the selective threshold value. The power level of the output power is controlled so that it does not exceed a maximum power level which is based on the level of the control signal.

15 Claims, 4 Drawing Sheets

COMPUTER SYSTEM INCLUDING POWER SUPPLY CIRCUIT WITH CONTROLLED OUTPUT POWER

This application is a continuation of U.S. patent application Ser. No. 08/720,211, filed on Sep. 26, 1996, now issued as U.S. Pat. No. 5,801,522.

BACKGROUND OF THE INVENTION

1. Field of the Invention

This invention relates to a power supply circuit for a computer system or the like, and more particularly to a power limit circuit which is adaptable for varying input voltage, useful in a computer system or similar electronic equipment. In particular, the invention relates to an off-line, power factor corrected (PFC), power supply circuit.

2. Discussion of Prior Art

In the manufacture of computer systems, it is preferable to produce a single model that is operable in a wide variety of settings, rather than tailoring a system to each different setting. A computer unit which is to be operated from AC line power is preferably adapted to accept a wide range of input voltages, 110V or 220V, 50 Hz or 60 Hz, for worldwide utility. Even though the nominal ratings are 110V and 220V, the power supply might allow the computer system to be operable from a low of 90V to a maximum of 265V, without intervention by an operator to make any adjustments via selector switches or the like.

A power supply circuit which allows operation over this wide range of AC line voltages is described by G. A. Hall et al. in "Application Note 33" at pages 226–234 in Applications Handbook, published 1995 by Micro Linear Corporation, 2092 Concourse Drive, San Jose, Calif. 95131. This power supply circuit uses a Micro Linear ML4824 controller as described at pp. 7-143 to 7-152 of Applications Handbook. This controller includes a power factor corrector circuit and a pulse width modulator type voltage control circuit. The power supply circuit described therein accepts an AC input of 80V to 264V and produces the usual computer operating voltages of 3V, 5V and 12V DC.

However, a power supply as described by Hall et al. presents a problem due to the wide range of input currents for differing AC line voltages, assuming a constant power output. For a computer system rated at 750 Watts, for example, the input current would be 8.3 Amp at 90V input, while at 265V input the current would be 2.1 Amp. At the lower AC line voltages, the line current can be precariously close to the trip current of a fuse or circuit breaker that must be in series with the AC power line. The high current condition must be avoided, as the equipment will be thought by a user to be unreliable, when indeed it is the low line voltage condition that is causing the high current. Of course, there will be loss of data and awkward restart chores if the fuse is tripped while operating in a normal running condition. Causing the fuse or circuit breaker to trip is a catastrophic shut down mode that is undesirable unless there is indeed a high current condition.

There are several methods which have previously been used in power supply circuits to limit the output power and prevent permanent damage to the power supply circuits in computer systems of this type. These include fixed current limit, under-voltage lockout, and fixed power limit, or a combination of these.

Fixed current limit and under-voltage lockout protects against fuse clearing, but is ineffective against component damage at high-input voltages. Fixed power limit is effective but does not allow higher output power at high voltages, and thus the power supply cannot be dual rated to take advantage of the ability of the power supply to provide higher output powers at high voltages.

In a typical power supply circuit using these principles, the AC input is monitored by circuits that produce voltage and current values, e.g., VRMS and $I_{AC}$ inputs are generated. These inputs are fed into a multiplier, producing a representation of power (P=IV), and this result is compared against a reference voltage. When the reference is exceeded, the duty cycle of the power supply is limited and thus the output power is limited. This arrangement, employed in the power supply circuit described by Hall et al. as set forth above, is effective in many situations, but still does not account for a wide range of input voltages, needlessly limiting power in some cases where it is not necessary.

SUMMARY OF THE INVENTION

It is therefore one object of the present invention to provide an improved power supply circuit for a computer system or the like.

It is a further object of the present invention to provide a system for monitoring the power level of the AC input line of a computer, and to allow operation at a wide range of input voltages, without unduly limiting operation at low or high voltage levels.

It is another object of the present invention to provide an improved power factor corrected (PFC) power supply for a computer system.

The above as well as additional objects, features, and advantages of the present invention will become apparent in the following detailed written description.

According to one embodiment of the invention, a method of monitoring the power level of a computer system or the like employs a detector for the RMS voltage of the input power line, and a detector for the AC input current at the power line. These detected levels are used to provide an indication of power input by feeding representations of the RMS voltage and AC input current into a multiplier, and the input of power input is compared against a reference voltage. When the reference voltage is exceeded, the output power of the power supply is limited by limiting the duty cycle of the AC-to-DC conversion within the power supply, particularly in a pulse width modulator within a power factor correction circuit. According to a feature of the invention, a dual power range is provided. For low AC line voltages, where the AC line current would tend to be high, a lower power limit is in effect, then for higher AC line voltages, where AC line current is proportionally lower for a given power level, a higher power limit is allowed. This is accomplished by a simple and efficient circuit, in an example embodiment; when the RMS voltage of the AC input exceeds a certain level, the values of resistors in a voltage divider within the RMS voltage detector circuit are changed so that a different power limit is provided which is in excess of the first power limit. The switchover from one power limit to another is done by a non-linear switch device such as a diode turning on and adding a resistor in the voltage divider, for example.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
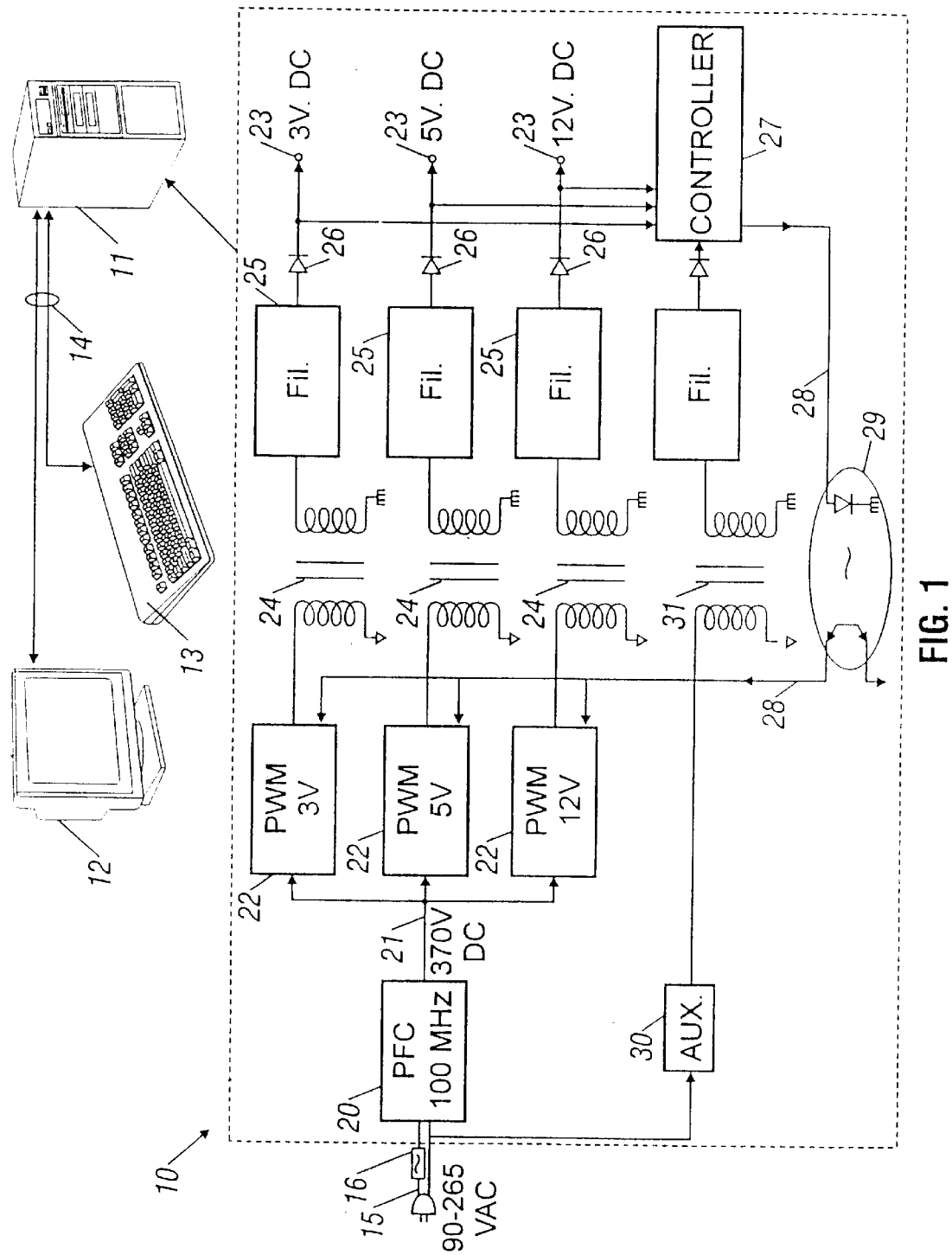
FIG. 1 is an electrical circuit diagram, partially in block form and partially in schematic form, of a power supply circuit for a computer system, according to an embodiment of the invention.

Referring to FIG. 1, a power supply circuit 10 is illustrated for use in a computer system having a system unit 11, a monitor 12, and a keyboard 13. This may be a stand-alone personal computer of the desk-top style, or may be a network server or a station on a local-area or wide-area network. Of course, the computer system may be a minicomputer size, or other electronic equipment of like construction. The system components of the computer are interconnected by cords 14, as is the usual practice. The computer system is connected to a power source in the form of an AC line cord 15. Usually the monitor 12 is powered by a separate cord to the AC line, rather than through the power supply 10.

The power supply circuit 10 is located within the system unit 11 as a separate circuit board or plug-in module. In the power supply circuit 10 the AC line input 15 is applied through a fuse or circuit breaker 16 to a power factor correction circuit 20 which may be constructed similar to that proposed by Micro Linear Corporation of San Jose, Calif. using part number ML4824, as mentioned above. The function of the power factor correction circuit 20 is to force the line voltage and line current to be in phase rather than having the input line current lag the line voltage as would be the case if uncorrected. This correction is accomplished by generating a high frequency, e.g., 100 KHz, pulsed signal from the 60-Hz line voltage, and using this high frequency pulsed voltage to drive the step-up converter for an AC-to-DC conversion. The pulse width is modulated to regulate the output power at output 21. In an example, the output voltage at output 21 is 370V DC, and this is used to drive three pulse width modulators 22 which are used to produce the three different DC voltage levels on outputs 23 for operating the components of the computer unit 11, e.g., 3V, 5V, and 12V, in this example. These outputs 23 are produced by stepdown transformers 24, filters 25, and rectifiers 26. The outputs 23 are monitored by voltage detector circuits in a controller 27 for feeding back via path 28 including optical coupler 29 (which may be comprised of several optical couplers, one for each output voltage level) to the pulse width modulators 22 for regulating the DC outputs as line voltage and output loading change. The controller 27 is separately powered via auxiliary AC-to-DC converter 30 and transformer 31. The DC-to-AC converters or pulse width modulators 22 contain oscillators to produce 100 KHz pulses and controlled switches such as power FETs or controlled rectifiers in series with the transformer primaries 24 for controlling the duty cycle of the 100 KHz pulses produced by the oscillators, in response to the feedback 28.

Figure 2:
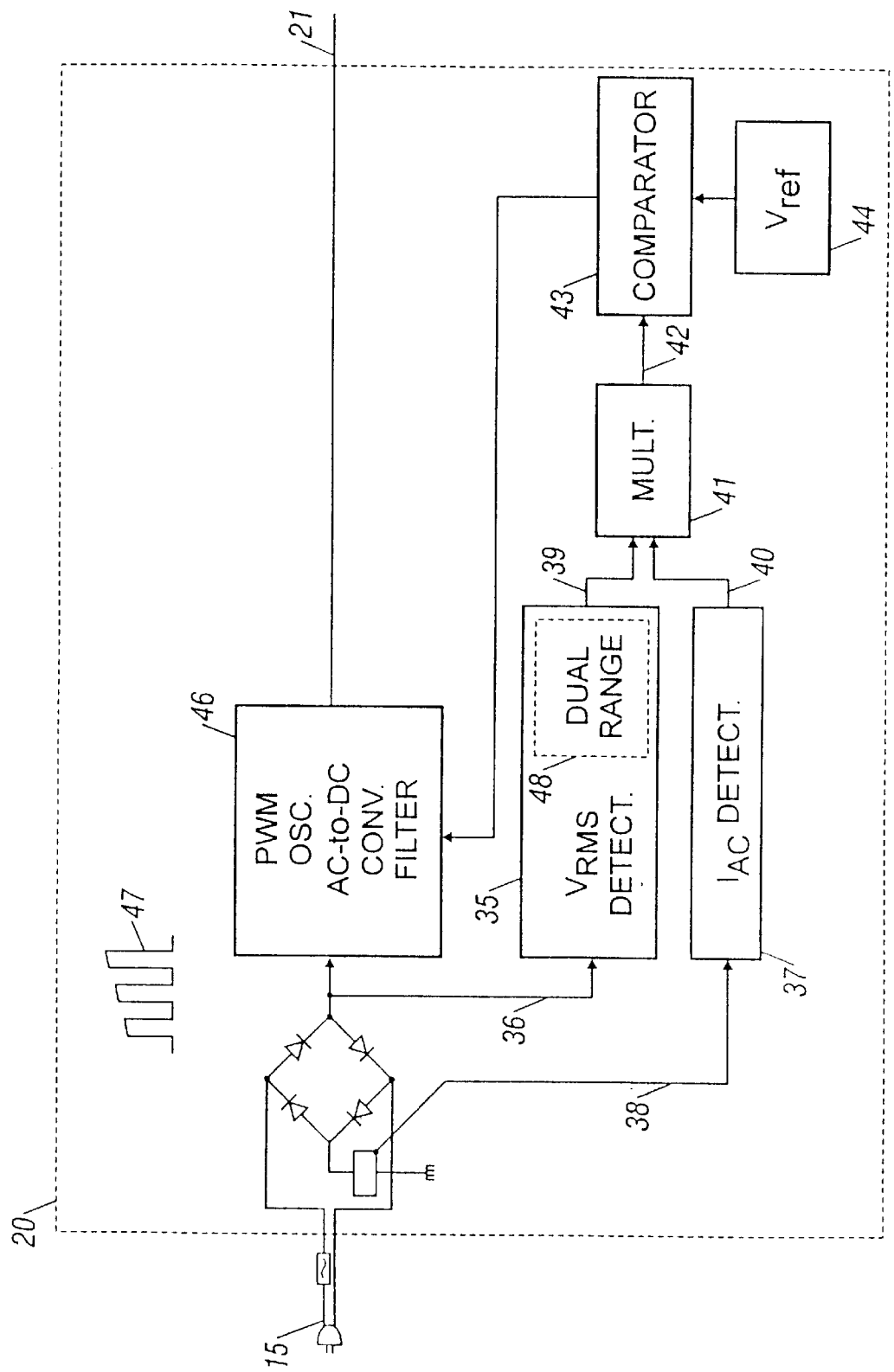
FIG. 2 is an electrical circuit diagram of the power limit circuit of the power supply circuit of FIG. 1.

Referring now to FIG. 2, an arrangement for monitoring the power level of the computer system of FIG. 1 within the power factor controller 20, and producing a dual power range, according to the invention, employs a detector 35 responsive to the RMS voltage of the input power line 15 via input 36, and a detector 37 responsive to the AC input current at the power line 15 via input 38. These detected levels of $V_{RMS}$ and $I_{AC}$ at outputs 39 and 40 are used to provide an indication of power input by feeding representations of the RMS voltage and AC input current into a multiplier circuit 41, and the output 42 of the multiplier, representing power input on AC line 15 (P=IV), is applied to a comparator 43, where it is compared to a reference voltage 44. When the reference voltage 44 is exceeded, the output power of the power factor corrector 20, and thus of the power supply 10, is limited by limiting the duty cycle (waveform 47) in an AC-to-DC convertor 46 via feedback path 48.

According to a feature of the invention, when the input RMS voltage on line 15 exceeds a certain level as indicated by the output of the RMS voltage detector 35 of FIG. 2, by a simple and efficient power range shift circuit 49 as described in more detail below, the values of resistors in a voltage divider within the detector circuit 35 are changed so that a different power limit is provided which is in excess of the first power limit. Multiple levels of power limits may be provided, rather than only two levels as in this illustrative embodiment.

Figure 3:
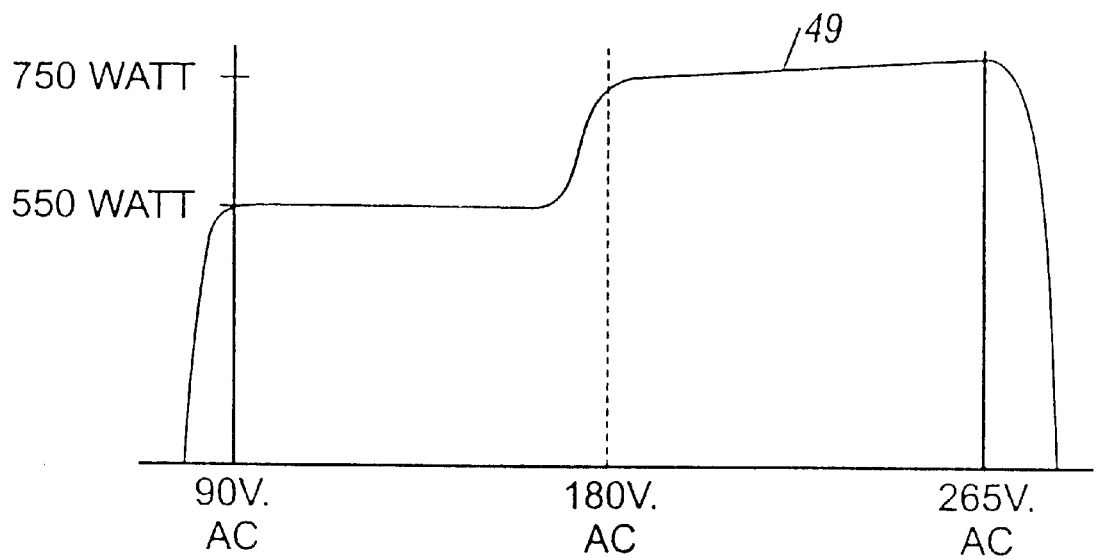
FIG. 3 is a graphical representation of power plotted as a function of line voltage for the power supply circuit of FIGS. 1 and 2, produced by operation of the dual power range feature of the invention.
Figure 4:
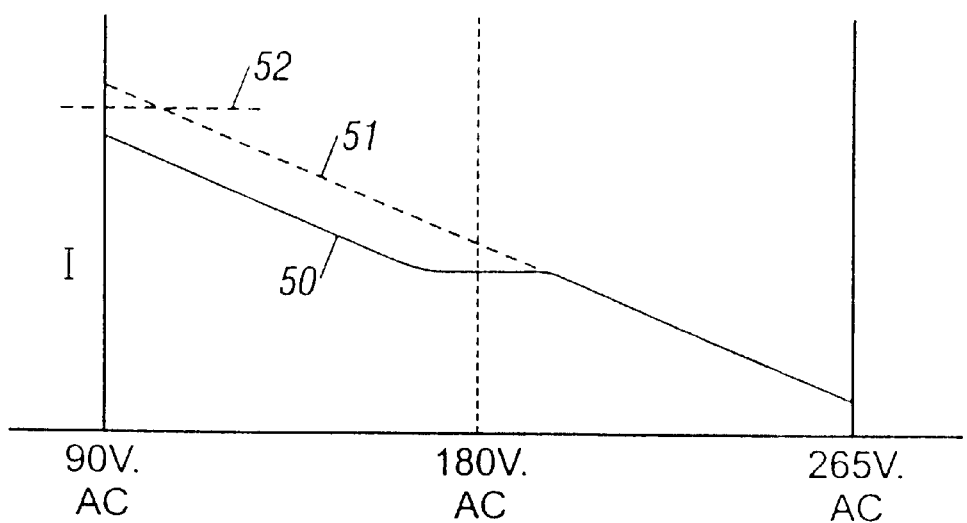
FIG. 4, similar to FIG. 3, is a graphical representation of AC line current plotted as a function of AC line voltage for the power supply circuit of FIGS. 1 and 2, produced by operation of the dual power range feature of the invention.

Referring to FIG. 3, a graph of power P vs. RMS input voltage V is shown, illustrating the change in power limit. The AC input voltage on line 15 may vary from 90V up to 265V in the example, and the power limit has two distinct ranges, shown by the line 50. Below about 180V, the power limit is about 550 watts, and above this level the power limit is about 750 watts. Below 90V and above 265V, the power supply should shut down (by means of other circuitry, not shown), as these voltage levels are out of specification. Either extreme should be avoided as it may damage the equipment or cause the fuse or circuit breaker to trip. In FIG. 4, a plot of AC line current vs. AC line voltage shows a line 51 with two distinct ranges, one below 180V and one above. If the dual range feature of the invention were not used, the line current would increase linearly with lower line voltage, for constant power output, as indicated by the dotted line 52, which might exceed a trip point 53 of the fuse or circuit breaker 16 in the AC line 15. Note that the lower range encompasses the typical AC line voltage of 110–120V, and the upper range encompasses the typical 220V value. Usually an office computer used as a server, loaded with more memory, network cards, larger hard disk, etc., would typically be plugged into a 220V line, whereas a home computer (which would not need some of the power-consuming components used in a server) would more likely be plugged into a 110V AC supply. So, two distinct ranges of line voltage and power level are provided, and these match with common uses of the computer systems.

Figure 5:
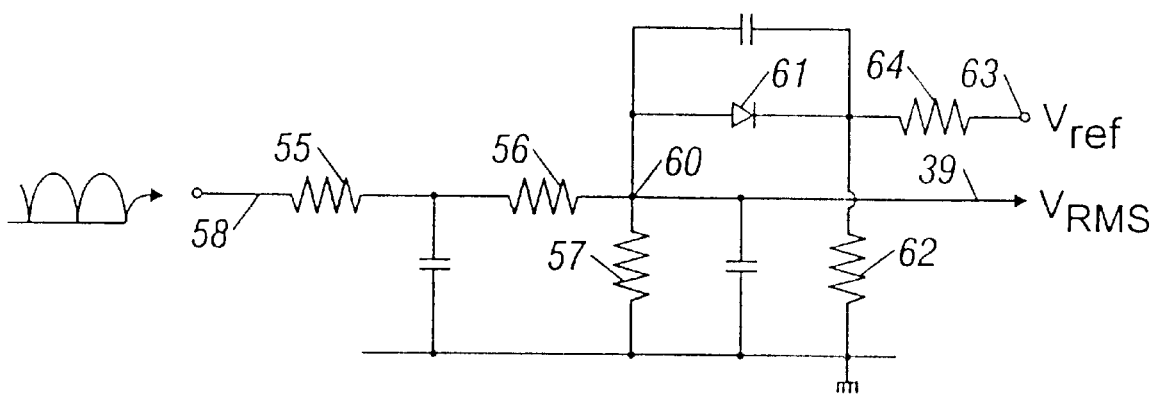
FIG. 5 is an electrical diagram in schematic form of a dual-range circuit for a power limit circuit of FIG. 2, according to a particular embodiment.

In FIG. 5, a circuit for creating the dual power range feature as discussed above is illustrated. The RMS voltage detector 35 includes a voltage divider made up of resistors 55, 56 and 57 connected between a full wave rectified AC input point 58 and ground or reference potential 59. A voltage at node 60 across the resistor 57 is the RMS voltage indicator used as an input 39 to the multiplier 41 (within the ML4824 device). Capacitors are used in the voltage divider for smoothing and filtering. A diode 61 and a resistor 62, along with a reference voltage source 63 and a resistor 64, provide the dual range feature. When the voltage on the node 60 exceeds the portion of reference voltage 63 defined by the divider made up of resistors 62 and 64, plus the forward voltage of the diode 61, the diode conducts and places the resistor 62 in parallel with the resistor 57, changing the voltage divider made up of resistors 55, 56, 57. The resistance between node 60 and ground will then be a smaller fraction of the total resistance, so a smaller proportion of the voltage at 58 appears at node 60 and output 39, when the diode 61 is conducting. So, in the higher voltage range of FIG. 3, the power limiting function is set at a higher level, compared to when the AC line voltage is below 180V, producing the 550 watt and 750 watt power ranges.

In one example of construction of the circuit of FIG. 5, using a Micro Linear ML4824 power factor correction device as mentioned above to perform the multiply and control functions for the circuit 20, the following values were used for the components of the dual range circuit:

| | |
|---|---|
| Resistor 55 = ~1 Meg | Resistor 56 = 100K |
| Resistor 57 = 18.2K | Resistor 62 = 24.3K |
| Resistor 64 = 147K | Ref. Voltage 63 = 7.5 V |
| Diode 61 Fwd Drop = 0.6 V | |

While the invention has been particularly shown and described with reference. to a preferred embodiment, it will be understood by those skilled in the art that various changes in form and detail may be made therein without departing from the spirit and scope of the invention.

What is claimed is:

1. A computer system comprising:
   a computer system unit;
   a power supply circuit coupled to receive input power and generate output power, the power supply circuit including a circuit to generate a control signal related to the power level of the input power, the control signal having a first value relative to an input signal if the input signal level exceeds a selected threshold level and the control signal having a second value relative to the input signal if the input signal level does not exceed the selected threshold level, wherein the power level of the output power is controlled so that it does not exceed a maximum power level which is based on the level of the control signal; and
   a plurality of power-consuming elements housed within the computer system unit, the power consuming elements being powered by the output power from the power supply circuit;
   wherein the power supply circuit comprises:
   a rectifier;
   a current detector with an input coupled to the rectifier;
   a voltage detector with an input coupled to the rectifier;
   a divider circuit with an input coupled to an output of the voltage detector;
   a multiplier with a first input coupled to an output of the divider circuit and a second input coupled to an output of the current detector;
   a comparator with an input coupled to an output of the multiplier; and
   an AC-DC converter with a signal input coupled to the rectifier and a control input coupled to an output of the comparator.

2. The system of claim 1 and further comprising a source of AC power input coupled to the power supply circuit.

3. The system of claim 2 wherein the source of AC power input comprises a power cord.

4. The system of claim 1 and further comprising keyboard coupled to the computer system unit.

5. The system of claim 1 wherein the ratio of the control signal to the input signal has a first value if the voltage level of the input signal exceeds a selected threshold voltage level and the ratio of the control signal to the input signal having a second value if the voltage level of the input signal does not exceed the selected threshold voltage level.

6. The circuit of claim 1 wherein the divider circuit comprises:
   a first resistor with a first terminal coupled to a voltage divider input terminal;
   a second resistor with a first terminal coupled to a second terminal of the first resistor, the second resistor having a second terminal coupled to a reference voltage node;
   a third resistor with a first terminal coupled to the reference voltage node; and
   a switch coupled between the first terminal of the second resistor and a second terminal of the third resistor.

7. The circuit of claim 1 wherein the divider circuit comprises:
   a first resistor with a first terminal coupled to a voltage divider input terminal;
   a second resistor with a first terminal coupled to a second terminal of the first resistor, the second resistor having a second terminal coupled to a reference voltage node;
   a third resistor with a first terminal coupled to the reference voltage node; and
   a switch coupled between the first terminal of the second resistor and a second terminal of the third resistor.

8. The system of claim 1 and further comprising a monitor coupled to the computer system unit.

9. A power supply circuit comprising:
   an input terminal to receive an input signal;
   a circuit to generate a control signal, the ratio of the input signal to the control signal having a first value if the level of the input signal exceeds a selected threshold level and the ratio of the input signal to the control signal having a second value if the level of the input signal does not exceed the selected threshold level; and
   an output terminal to provide an output signal, wherein the power level of the output signal is controlled so that it does not exceed a maximum power level which is based on the level of the control signal;
   wherein the circuit comprises:
   a first resistor with a first terminal coupled to a circuit input terminal;
   a second resistor with a first terminal coupled to a second terminal of the first resistor, the second resistor having a second terminal coupled to a reference voltage node;
   a third resistor selectively coupled in parallel with the second resistor depending upon whether or not the input signal voltage exceeds a selected threshold voltage level.

10. The circuit of claim 9 wherein the circuit comprises a voltage divider.

11. The circuit of claim 9 and further comprising rectifying circuit coupled to an input of the circuit.

12. The circuit of claim 9 and further comprising:
a voltage detector to provide a detected voltage signal indicative of the voltage level of the input signal, the detected voltage signal being provided to the circuit;
a current detector to generate a detected current signal indicative of the current level of the input signal; and
a multiplier circuit with a first input coupled to an output of the current detector and a second input coupled to an output of the voltage detector.

13. A power supply circuit comprising:
a rectifier;
a current detector with an input coupled to the rectifier;
a voltage detector with an input coupled to the rectifier;
a voltage divider with an input coupled to an output of the voltage detector, the voltage divider including a switch which is activated when the voltage level at the input exceeds a threshold voltage level;
a multiplier with a first input coupled to an output of the voltage divider and a second input coupled to an output of the current detector;
a comparator with an input coupled to an output of the multiplier; and
an AC-DC converter with a signal input coupled to the rectifier and a control input coupled to an output of the comparator.

14. The circuit of claim 13 wherein the voltage divider comprises:
a first resistor with a first terminal coupled to a voltage divider input terminal;
a second resistor with a first terminal coupled to a second terminal of the first resistor, the second resistor having a second terminal coupled to a reference voltage node; and
a third resistor with a first terminal coupled to the reference voltage node; wherein the switch is coupled between the first terminal of the second resistor and a second terminal of the third resistor.

15. The circuit of claim 13 wherein the AC-DC converter includes a pulse wave modulator.

* * * * *